Oct. 15, 1929.   E. B. CADWELL ET AL   1,731,814
AUXILIARY TRACTION AND LOAD CARRYING UNIT FOR MOTOR VEHICLES
Filed May 24, 1926   2 Sheets-Sheet 2
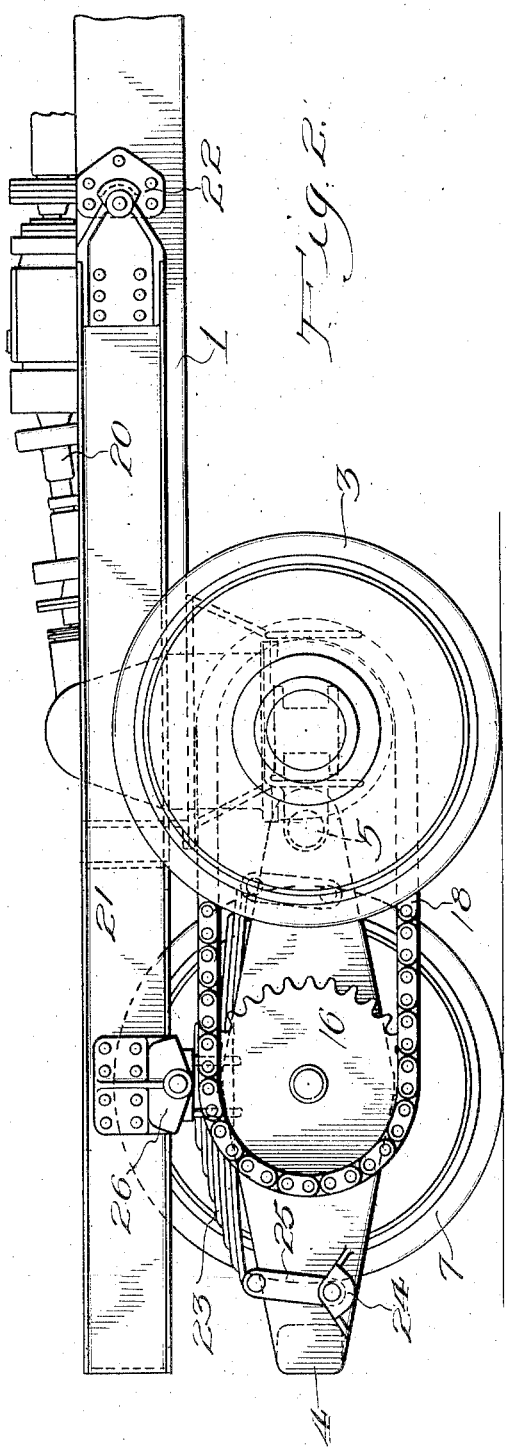
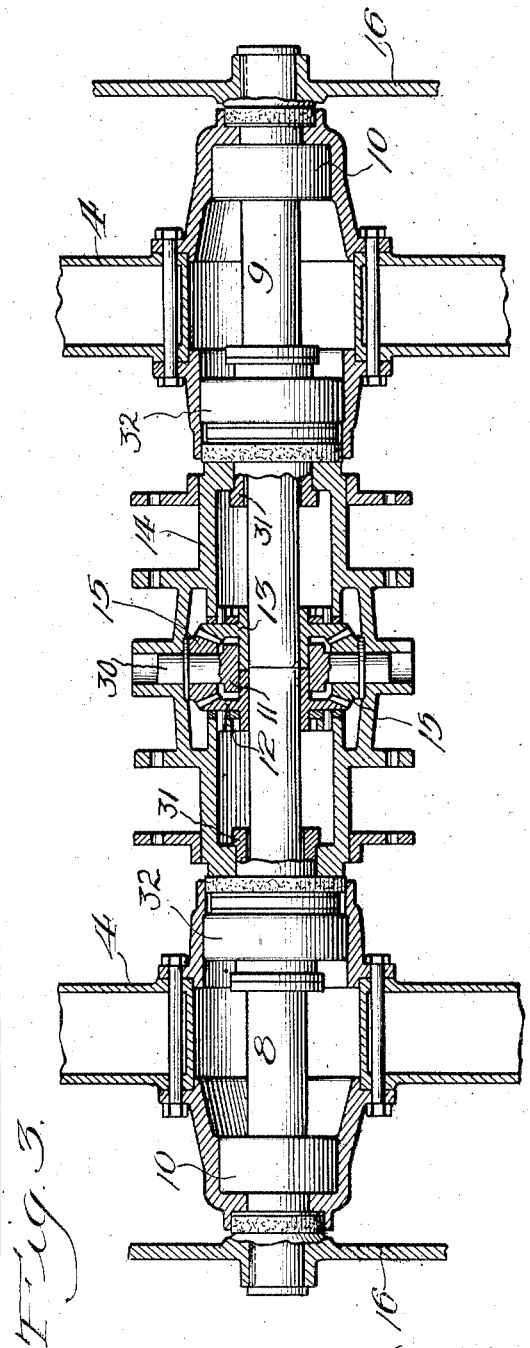

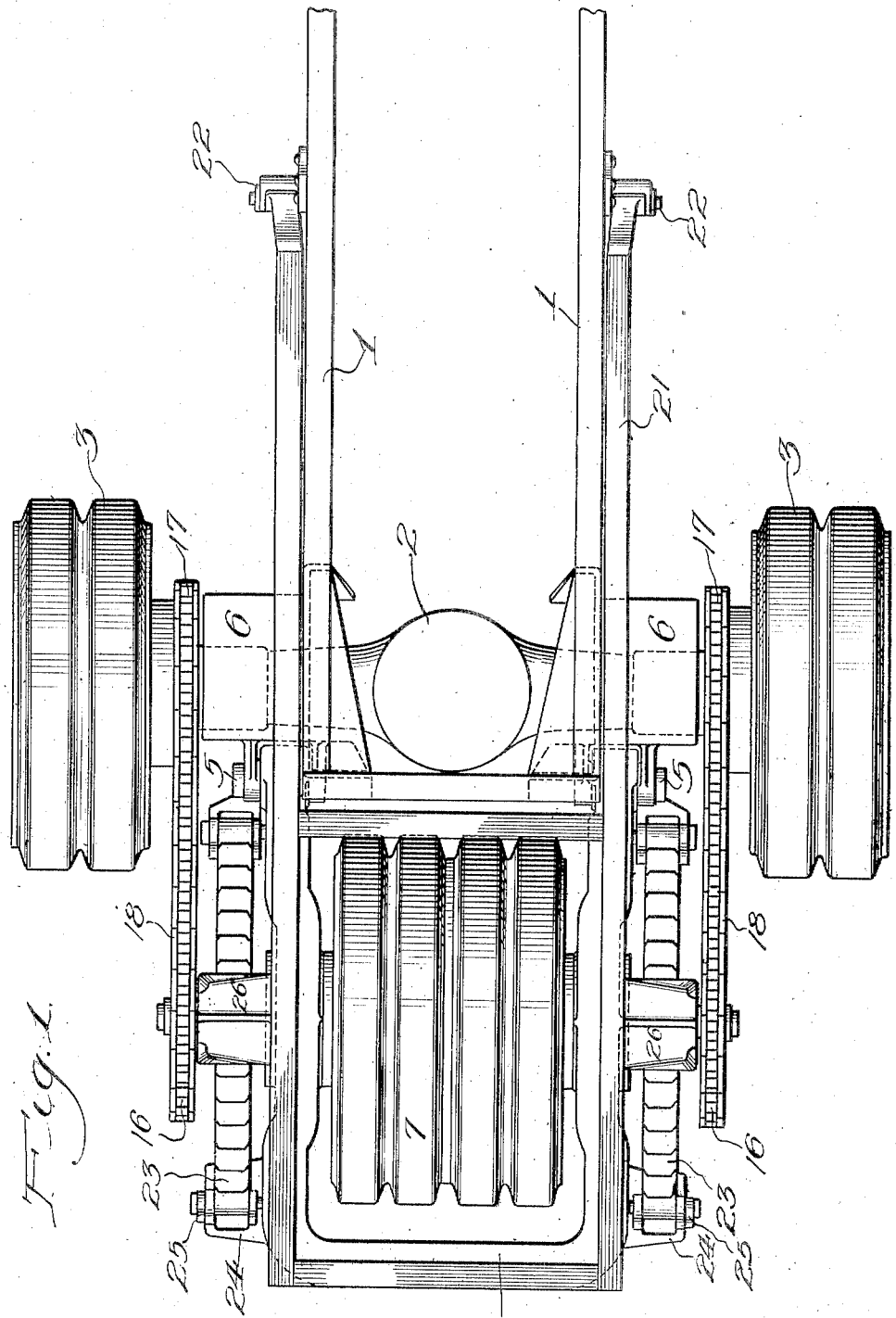

Patented Oct. 15, 1929

1,731,814

UNITED STATES PATENT OFFICE

EDWIN B. CADWELL, OF NEW YORK, N. Y., AND ARTHUR B. WEBB, OF WATERTOWN, WISCONSIN, ASSIGNORS TO THE RIGHTWAY CORPORATION, A CORPORATION OF INDIANA

AUXILIARY TRACTION AND LOAD-CARRYING UNIT FOR MOTOR VEHICLES

Application filed May 24, 1926. Serial No. 111,197.

The present invention has for its object to produce a simple and novel unit that may be attached to a truck or other power driven vehicle to give the latter added traction.

A further object of the present invention is to produce a simple and novel auxiliary traction unit for a power driven vehicle, whose wheel or wheels may be driven from the differential driving axle or other differential mechanism of the vehicle in such a manner that the auxiliary device will always exert a tractive effort, even under conditions that would ordinarily permit one of the main traction wheels to spin.

Regardless of the location for the auxiliary traction unit with respect to the vehicle, it may be utilized as a load carrier and thus increase the carrying capacity of the truck or of the vehicle, by providing a frame supported in part by the auxiliary unit and in part by the vehicle. Therefore, viewed in one of its aspects, the object of the present invention may be said to produce a simple and novel auxiliary traction unit for a power driven vehicle, which unit shall also be capable of serving as an efficient load carrier.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a top plan view of the rear end of a truck having our improvements applied thereto, all of the old parts unnecessary for an understanding of the invention being omitted; Fig. 2 is a side elevation of the rear end of the truck and the attachment; and Fig. 3 is a central section taken through the long axis of the traction device on the auxiliary unit.

Referring to the drawings, 1 represents the frame of a power driven vehicle; 2 the casing of the differential rear driving axle; and 3 the rear traction wheels. The auxiliary traction device, as shown, consists of a strong U-shaped frame 4 lying in rear of the driving axle and having its open end directed forwardly. The free ends of the arms of the frame 4 are hinged, as indicated at 5, 5, to suitable castings 6, 6 secured upon or forming part of the housing 2; so that the frame of the auxiliary unit may be said to be hinged to the differential driving axle. Arranged within the open center of the frame 4 is a traction device. This traction device is shown as taking the form of a single wheel 7 of wide tread and, for the sake of brevity, the detailed description will be confined to this particular construction, although the invention is not limited thereto. The wheel 7 is mounted on an axle parallel with the rear axle of the vehicle, this auxiliary axle being shown in detail in Fig. 3. The auxiliary axle is made in two sections, 8 and 9, arranged end to end and each mounted in one of the arms of the frame 4. Each axle section is supported at its outer end by an anti-friction bearing 10 of any usual or suitable construction. On the inner end of each axle section is a bevel gear, these two gears, indicated at 12 and 13, facing each other but being spaced apart from each other. A spider 11 surrounds and is rotatable relatively to the hubs of these gears. A rotatable housing 14 surrounds the inner ends of the axle sections. A series of pinions 15, whose axes of rotation are radial to the long axis of the auxiliary axle and which lie between and mesh with the gears 12 and 13 are carried by the spider; these pinions being rotatable on radial stub shafts 30 projecting from the spider 11 into bearings in the housing. The housing has two hubs or sleeves 31 at its ends that are externally supported by suitable anti-friction bearings 32 in the frame 4. When the two sections of the axle are rotated in the same direction and at the same speed, the gear members 12, 13 and 15 lock the member 14 to the axle so that the axle and the member 14 rotate in unison with each other. If one-half of the axle moves angularly relatively to the other half, then the member 14 will be given a rotary movement which is a differential between the rotary movements of the two axle sections. The member 14, serves as the hub of the auxiliary traction device.

In the arrangement shown, the differential driving mechanism from which the auxiliary axle is driven, is located in the main rear axle, and the detailed description will be confined to this particular arrangement, although it is sufficient that the main differential mechanism be placed anywhere between the power unit and the main traction wheels, so that the auxiliary traction device may be driven from complementary elements of the main differential mechanism.

On the outer end of each of the two axle sections 8 and 9 is fixed a sprocket wheel 16. On the inner side of each of the main traction wheels 3, is secured a sprocket wheel 17. An endless sprocket chain 18 extends over each of the sprocket wheels 16 and the corresponding sprocket wheel 17, so that each half of the auxiliary axle must rotate in unison with and at the same speed and in the same direction as the corresponding main traction wheel of the vehicle. The result is that whenever one of the main traction wheels rotates, even though the other be stationary, the differential auxiliary axle will cause the auxiliary traction wheel to rotate; and therefore the vehicle will have traction under conditions which would prevent the main traction wheels from exerting an effective tractive effort.

If the auxiliary traction unit be made heavy it will serve as an effective tractor driven from the main power plant, of which only the main driving shaft 20 is shown, to assist the main driving wheels in pushing or pulling the vehicle. However, the auxiliary unit may be caused to serve as a useful load carrier, thus increasing the capacity of the vehicle. To this end we have provided an auxiliary vehicle frame 21 which, as shown, is also U-shaped, but preferably much longer than the frame 4. The open end of the frame 21 is directed forwardly, the arms lying outside of and beside the side bars or rails of the main frame 1. The front ends of the arms of the frame 21 are hinged to the main frame, as indicated at 22, to permit the frame 21 to swing about a horizontal axis at a considerable distance in front of the hinge axis of the frame 4. The rear end of the frame 21 rests on vehicle springs 23 arranged between it and the underlying frame 4. In the arrangement shown, the frame 4 has on each side, toward the front and rear, outwardly projecting brackets 24 to which are pivoted the lower ends of swinging struts 25 that are pivotally connected at their upper ends to the ends of the corresponding springs 23; and the frame 21 has brackets 26 extending laterally from the same above the centers of the springs 23 and forming saddles for the springs.

It will be seen that the auxiliary traction wheel swings on a short radius; but, by constructing the auxiliary frame 21 in such a way that its swinging radius is comparatively long, the angle through which the frame 21 swings as the auxiliary traction device rises and falls, due to unevenness of the road, is much smaller than the angle through which the frame 4 of the auxiliary unit swings; thus avoiding objectionable displacement of the auxiliary frame 21 out of its normal horizontal position.

While the principal field of use of our invention may be in connection with tractors where either additional traction or additional load-carrying capacity, or both, are required; yet it will be seen that there are certain structural features of the invention that will make it applicable to a much wider field of use. For example, it may be desired to provide a vehicle of any kind with more surface in engagement with the road to support the load, even though the vehicle be sturdy enough to carry the load; namely, for the purpose of complying with highway regulations as to the amount of weight that may be carried per inch of tire width. Therefore our attachment will be useful as a simple wheeled load-carrying device hinged to the vehicle so as to be capable of swinging about a horizontal axis only, so that the weight of the load will be distributed between the wheels of the vehicle itself and the wheels of the added unit.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. The combination with a power driven vehicle having traction wheels and a differential driving mechanism for said wheels, of an auxiliary traction unit connected to said vehicle and having a traction device, and a differential driving connection between said traction device and the two power delivering ends of said differential driving mechanism.

2. The combination with a power driven vehicle having a differential driving axle and traction wheels, of an auxiliary traction unit connected to said vehicle and having a traction device and a differential driving means for said traction device driven from both sections of said axle.

3. The combination with a power driven vehicle having a differential driving axle and traction wheels, of an auxiliary traction unit connected to said vehicle and having a wheeled differential axle, and means between the corresponding sections of said axles to cause the driving axle to drive the other axle.

4. The combination with a power driven vehicle having traction wheels and a differential driving mechanism for said wheels, of an auxiliary traction unit connected to said vehicle and having a differential axle and a traction device thereon, and a driving connection between said axle and the two power delivering ends of said differential driving mechanism.

5. The combination with a power driven vehicle having traction wheels and a differential driving mechanism for said wheels, of an auxiliary traction unit connected to said vehicle and having a divided axle and a traction device forming part of a differential connection between the sections of the axle, and a driving connection between the sections of said axle and complementary elements of said differential driving mechanism.

6. The combination with a power driven vehicle having a differential driving axle and traction wheels, of an auxiliary traction unit connected to said vehicle and having a divided axle and a wheel forming part of a differential connection between the sections of the axle, and a driving connection between each section of the divided axle and the corresponding section of the first axle.

7. The combination with a power driven vehicle having a differential driving axle and traction wheels, of an auxiliary traction unit comprising a frame hinged to the vehicle, a two-part axle journalled in said frame and having opposed separated similar gears at their inner ends, a member surrounding and rotatable about the inner ends of said two-part axle, a traction device on said member, pinions on said member lying between and meshing with said gears, and driving connections between both ends of said axles.

8. The combination with a vehicle having power driving means and traction wheels, of an auxiliary traction unit hinged to the rear end of the vehicle, a driving connection between said power driving means and said unit, a frame hinged to the vehicle a considerable distance forward from the hinge between the vehicle and said unit and extending rearwardly over said unit, and supporting springs for the rear end of said frame arranged between the frame and said unit.

9. The combination with a vehicle having power driving means and a rear wheeled axle, of a U-shaped frame located behind the aforesaid axle and having the free ends of its arms hinged thereto, a traction device mounted in said frame, a driving connection between said power driving means and said traction device, a second longer U-shaped frame overlying the other frame and having the free ends of its arms connected to the vehicle in front of said axle, and load-supporting springs between said frames.

10. The combination with a vehicle having power driving means and traction wheels, of an auxiliary traction unit hinged thereto so as to be capable of swinging about a transverse horizontal axis and permit said traction wheels to engage the road, a driving connection between said power driving means and said unit, and a load-supporting device extending over said auxiliary unit and hinged to said vehicle so as to be capable of swinging about an axis parallel to the aforesaid axis.

11. The combination with a vehicle having power driving means and traction wheels, of an auxiliary traction unit hinged to said vehicle so as to swing about a transverse horizontal axis, a driving connection between said power driving means and said unit, and a load-supporting device hinged at one end to said vehicle so as to be capable of swinging about a transverse horizontal axis and supported at its other end by said traction unit, the horizontal distance between the hinge axis of said unit and a vertical plane passing through the line of contact of said unit with the road being much less than the horizontal distance between said plane and the hinge axis of said load-supporting device.

12. The combination with a self-supporting vehicle, of an auxiliary wheeled unit hinged to said vehicle so as to be capable of swinging about a transverse horizontal axis only, and a load-supporting device hinged to said vehicle for swinging movements about an axis parallel to the aforesaid axis and supported in part by said unit.

13. The combination with a power driven vehicle of a pair of traction wheels, a third traction wheel for said vehicle, a differential driving means between the first mentioned traction wheels, and a differential driving means for the third traction wheel driven from both the other two traction wheels.

In testimony whereof, we sign this specification.

EDWIN B. CADWELL.
ARTHUR B. WEBB.